Nov. 19, 1968   R. H. KROCK ET AL   3,411,902
METHOD OF PRODUCING INFILTRATED CONTACT MATERIAL
Filed Jan. 22, 1968
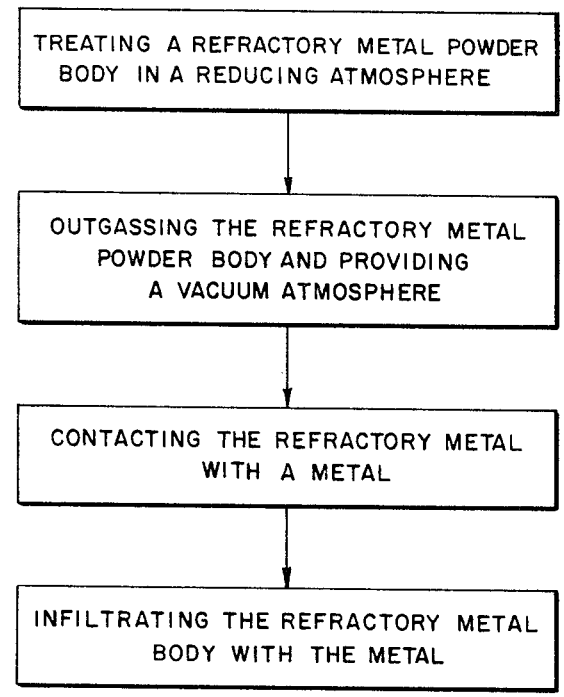
FIG. 1
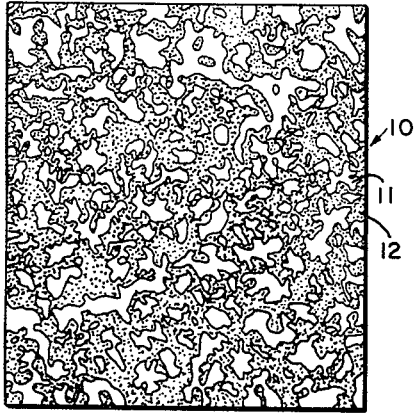
FIG. 2
INVENTORS
EDWARD J. ZDANUK
RICHARD H. KROCK
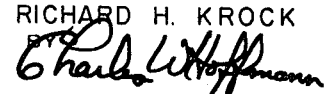
ATTORNEY

United States Patent Office 3,411,902
Patented Nov. 19, 1968

3,411,902
METHOD OF PRODUCING INFILTRATED
CONTACT MATERIAL
Richard H. Krock, Peabody, and Edward J. Zdanuk, Lexington, Mass., assignors to P. R. Mallory & Co., Inc., Indianapolis, Ind., a corporation of Delaware
Filed Jan. 22, 1968, Ser. No. 699,571
9 Claims. (Cl. 75—208)

ABSTRACT OF THE DISCLOSURE

A material for use as a current carrying material consisting essentially of a porous powder body of refractory metal, the voids of which are filled by a substantially continuous matrix of a second metal which is substantially mutually insoluble and substantially non-reactive with the refractory metal. The composite material is prepared by subjecting the porous body of refractory metal to the steps of treating the refractory metal body in a reducing atmosphere, outgassing the refractory metal body and, thereafter, vacuum infiltrating the porous body of refractory metal with a second metal which is substantially mutually insoluble and substantially non-reactive with the refractory metal. The composite constact material has a gaseous component content or component content which may release gas of about 7 p.p.m. and generally less than 2 p.p.m.

---

The present invention relates to powder metallurgy and, more particularly, to improved means and methods of providing composite materials having a gas content of content of materials which may release gas of about 7 p.p.m. or less for use as contact materials in circuit interrupters such as switching devices and the like which may operate in a vacuum atmosphere.

Refractory metals such as tungsten and molybdenum and to a lesser extent rhenium, and tantalum are used in electrical contact materials. Refractory metals, in particular tungsten and molybdenum, are used in current carrying materials because of their inherent characteristics of hardness and of resistance to erosion or arc erosion and to welding. Due to the inherent characteristics of the refractory metals, they are less likely to pit than contact materials fabricated from metals such as copper, gold and silver. However, pure refractory contact materials possess high electrical resistance which lowers the efficiency and reliability of the refractory contact material. In addition, the refractory metals tend to have relatively low vapor pressure which results in relative high current chopping levels.

It is thought that a composite composed essentially of a refractory material and a matrix of a second metal which is substantially mutually insoluble and substantially non-reactive with the refractory metal for use as an electrical contact material might make advantageous use of the sereral outstanding characteristics of both metals. In the composite, the second metal, such as copper, silver and gold, which is substantially mutually insoluble and substantially non-reactive with the refractory metal provides the current carrying and thermal conductivity properties while the refractory metal such as tungsten and molybdenum contributes hardness, resistance, to arc erosion, and superior anti-weld properties. In order to use the aforementioned characteristics of the refractory metal and the second metal, it is desirable to fabricate the constituents in such a manner that the refractory metal is integrally joined with the matrix metal.

Composites of a refractory metal such as tungsten and a matrix metal such as copper may be prepared by pressing the mixed metal powders into the required shape in dies, and subsequently sintering in a hydrogen atmosphere above the melting point temperature of copper, preferably between 1250° and 1350° C. The hydrogen atmosphere appears to act as a flux and the molten copper wets the tungsten particles and cements the particles together. Another method which provides a harder and more dense resultant body consists of first pressing and sintering the tungsten powder so as to form a coherent but porous body, which is then heated to a temperature about 1200° to 1300° C. in a hydrogen atmosphere and in contact with molten copper. The copper is absorbed into the pores of the tungsten body by capillary attraction. The copper infiltrant imparts strength and ductility to the tungsten powder body and also provides he resultant body with higher current carrying capability and thermal conductivity. However, it is noted that the above process makes no attempt to reduce the gas content or the content of materials that may release gas during operation of the material in switching devices operating in a vacuum. Therefore, it would appear that the tungsten-copper material fabricated by this process would be unacceptable for use as a contact material in a vacuum environment for the material appears to have a gas content or content of materials which may release gas in excess of about 50 p.p.m.

Another suggested method of preparing composites of tungsten and copper alloys may be accomplished by using vacuum infiltration techniques. The tungsten body is contacted with a melt of copper and an agent such as, for example, zirconium which is thought to either raise the surface energies of the melt or the solid or lower the surface energy of the interface between the melt and the solid thereby favoring infiltration of the melt into the tungsten powder body. The vacuum apparently serves the dual function of assisting penetration of the copper-agent melt into the tungsten body and of decreasing the content of gases present. However, it was found that the resilient composites fabricated using the aforementioned vacuum sintering process resulted in composites having gas content or content of materals which may release to gas of about 10 p.p.m. or more which is not desirable if the contact material is to be used as a high current switching device in a vacuum environment. The currents contemplated are greater than several hundreds of amperes. (The abbreviation p.p.m. appearing above and hereinafter means parts per million.)

The generation of gas in a vacuum atmosphere by a contact material having a gas content or a content of materials which may release gas of more than about 10 p.p.m. is detrimental to the electrical vacuum switching device containing such contact material where the material is to be used in a high current switching device. Contact materials having more than 10 p.p.m. of gaseous content carrying currents of about several hundred amperes or more release gas pressure bursts of about $1 \times 10^{-4}$ torr or more. The generation of gas bursts of such a magnitude would make the high current vacuum switch using the contact material undesirable. In contact materials having less than 2 p.p.m. gas content, and carrying currents of about several hundred amperes or more release gas pressure bursts of about $10^{-5}$ torr or less, which is more acceptable and produces a more reliable contact material for use with high current carrying circuit interrupters in a vacuum environment. The resultant vacuum contact material fabricated by the instant process has a low gas content or material content which may release gas of about 7 p.p.m., generally 2 p.p.m. or less, thereby providing a more acceptable contact material for use in vacuum environments.

Therefore, it is an object of the present invention to provide a composite material suitable for use as a current carrying material in a vacuum atmosphere.

Another object of the present invention is to provide a composite material of a porous refractory body wherein the voids are filled with a matrix of a second metal which is substantially mutually insoluble and substantially non-reactive with the refractory metal for use as current carrying material.

Yet another object of the present invention is to provide a means and method of infiltrating a porous refractory metal body with a melt of a material which is substantially mutually insoluble and substantially non-reactive with the refractory metal.

Another object of the present invention is to provide a current carrying material which has a gas content and material content which may release gas of about 7 p.p.m., and generally less than about 2 p.p.m.

Yet still another object of the present invention is to provide a means and method of using a metal alloy as an infiltration stock for refractory metal bodies thereby providing a current carrying material having integrally joined refractory metal-second metal phases and having a gas content and material content which may release gas of about 7 p.p.m. or less.

A further object of the present invention is to provide a method of fabricating a current carrying material using the combination of a reducing atmosphere pretreatment step and vacuum infiltration step, the current carrying material having high electrical and thermal conductivity properties combined with low erosion under arcing and superior anti-weld properties.

Another object of the present invention is to provide a current carrying material consisting essentially of a refractory metal and a metal which is substantially mutually insoluble and substantially non-reactive with the refractory metal, the refractory metal constituting the majority by volume percent of the current carrying material.

A further object of the present invention is to provide a current carrying material consisting of about 55 to 88% by volume refractory material, about 0.5 to 0.0% by volume reactive material, and about 45 to 12% by volume a material selected from the group consisting of copper, gold and silver prepared by the hydrogen pretreatment of a refractory body and the subsequent vacuum infiltration of the pretreated refractory body.

The present invention, in another of its aspects, relates to the novel features of the instrumentalities of the invention described herein for teaching the principal object of the invention and to the novel principles employed in the instrumentalities, whether or not these features and principles may be used in the said object and/or in the said field.

With the aforementioned objects enumerated, other objects will be apparent to those persons possessing ordinary skill in the art. Other objects will appear in the following description and in the appended claims.

In the drawing:

FIGURE 1 illustrates the several steps involved in the method of making the material used as a current carrying material.

FIGURE 2 illustrates the material used as a current carrying material.

Generally speaking, the present invention relates to the means and method of making a current carrying material. The current carrying material consists essentially of a refractory material and a second material which is substantially mutually insoluble and substantially non-reactive with the refractory material. The current carrying material has a gas content and material content which may release to gas of about 7 p.p.m. or less. The method includes the combination of steps or pretreating a refractory metal body, sintered or unsintered, in a non-reactive hydrogen containing atmosphere in which hydrogen is preferably used at a temperature below the sintering temperature of the refractory metal to substantially clean the surface oxide films from the refractory metal, that is a temperature of about 800° C. for at least ½ hour. Non-reactive atmosphere means that the atmosphere does not react with the refractory metal to produce deleterious or obnoxious products. The body is degassed at a temperature about 200° C. or more above the pretreatment temperature until a pressure of $5 \times 10^{-5}$ torr is realized and infiltrated with a metal alloy which is substantially mutually insoluble and substantially non-reactive with the refractory metal at a temperature of about 1100°–1200° C. It should be noted that the pretreatment conditions are used to clean the refractory metal body and may be insufficient to cause significant sintering during the pretreatment step.

More particularly, the means and method of the present invention relate to fabricating a current carrying material consisting essentially of a porous refractory body, sintered or unsintered, the voids of which are filled with a metal which is substantially mutually insoluble and substantially non-reactive with the refractory metal. The refractory metal may be selected from the group consisting of tungsten, molybdenum, rhenium, and tantalum. Of the several refractory metals tungsten and moylbdenum are preferred because of their inherent characteristics of hardness, resistance to arcing and low cost. Of the metals tungsten and molybdenum, tungsten is most preferred. The metal which is substantially mutually insoluble and substantially non-reactive with the refractory metal may be selected from the group consisting of copper, gold and silver. Of these several metals copper is most preferred. A small but significant percent by volume of a metal selected from the group consisting of zirconium and titanium may be alloyed with the copper, gold or silver metals. Of the metals zirconium and titanium, titanium is preferred.

The refractory metal powder used preferably has a particle size ranging between 1 and 10 microns. The powder is compacted in a suitable mold under a pressure ranging preferrably from 1 to 4 tons per square centimeter into a desired body shape. The compacting pressure and the particle size of the refractory metal may be varied over a wide range depending on the strength of the compact required and the porosity of the compact desired. The compacted refractory metal body, sintered or unsintered, is treated in a reducing or non-reactive atmosphere at a temperature of about 800° C. to about 1000° C. for about one half to one hour or more. The reducing atmosphere may be selected from the group of atmospheres consisting of hydrogen and dissociated ammonia. Of the several reducing atmosphers, hydrogen is preferred. The refractory metal body is vacuum outgassed at a temperature about 200°–250° C. higher than the temperature of the reducing atmosphere. The surfaces of the refractory body are contacted with a metal to be infiltrated into the refractory body. The refractory metal body is infiltrated in a vacuum environment with metal at a temperature sufficiently high to yield a free flowing soft metal melt. In the case of copper, the infiltration temperature contemplated is about 1100° to 1200° C. In the case of copper a temperature below about 1100° C, one experiences poor fluidity of the melt and about 1200° the melt appears to suffer excessive evaporation. The steps of the process are carried out without exposing of the refractory metal body to the atmosphere between steps.

In carrying out the present invention, a pretreated refractory metal body contacted with a second metal which is substantially mutually insoluble and substantially non-reactive with refractory metal in a heated vacuum environment results in the metal infiltrating the refractory powder body and forming a dense composite material having a low gas content. The gas and component content of materials which may release gas is 7 p.p.m. or less and generally less than 2 p.p.m. Using the same starting refractory metal without pretreatment and contacting the refractory metal with the same infiltrant in a vacuum environment having a temperature of about 1100–1200° C., results in a composite having a gas content and component content which may release gas of at least 10 p.p.m. Using a hydrogen atmosphere having a temperature of about 1250° to 1350° C. wherein the hydrogen acts as a flux and the melt wets the refractory metal results in a contact material having a gaseous content greater than 50 p.p.m. which material is unreliable when operated in a vacuum atmosphere.

Refractory metal particles may be compacted within the confines of a suitable mold by compacting pressures ranging between 1 to 4 tons per square centimeter thereby forming a "green" porous refractory metal body of sufficient strength to be handled. The porous tungsten body, sintered or unsintered, is subject to a treating step in a reducing atmosphere at a temperature of about 800–1000° C. for a time of about one half hour or more. The treating temperature may be below the temperature required for sintering of the refractory metal particles. A treating time duration of less than 30 minutes at the above temperatures is through to be insufficient to remove the oxide film on the surface of the refractory metal particles. The treating of the refractory metal powder body substantially removes the refractory oxide film from the surfaces of the individual refractory metal particles.

It should be pointed out that the treatment of the refractory metal body in a reducing atmosphere and the subsequent infiltration of the refractory metal body with a melt in a vacuum atmosphere is necessary in order to realize a current carrying contact material having a gas content and material content that may release gas of less than 7 p.p.m.

The gas content and material content which may release gas is determined by heating the composite to a temperature greater than the melting point temperature of the refractory metal, for example tungsten (3370° C.), using an electric arc in the vacuum apparatus.

The refractory metal content of the composite material is about 55 to 88% by volume of the total volume of the composite the remainder copper, gold or silver or said metals mixed with a reactive metal. It is thought that a refractory metal content of less than about 55% by volume results in undesirable contact characteristics such as contact welding and arc erosion. It is thought that a refractory metal content of more than 88% by volume of the total composite volume results in undesirable electrical characteristics such as poor conductivity. The preferred percent by volume refractory metal is 78.5%, the remainder copper, gold or silver. If a reactive metal is alloyed with either copper, gold or silver, it is thought that the volume of the reactive metal should not exceed about 0.4% by volume of the total composite volume. Exceeding this volume may result in a matrix alloy having undesirable conductivity characteristics. In the situation where a reactive metal is used the preferred volume percent of the refractory metal is 78.5%, the preferred volume percent of a metal selected from the group consisting of copper, gold or silver is 21.3%, the remainder reactive metal.

In the situation where a reactive metal is mixed with the copper, gold, or silver to form a metal alloy matrix it is believed that an electron probe analysis of the region between the refractory metal particles will show segregation or high concentration of the reatcive metal in the interface region between the refractory metal and the metal alloy which is substantially mutually insoluble and substantially non-reactive with the refractory metal thereby raising the overall electrical conductivity of the alloy metal. Where a reactive metal is used, the gas content and material content that may release gas is about 1 p.p.m. or less indicating that the reactive metal provides a getting function as well as promoting infiltration of the stock into the porous refractory body.

Referring now to the drawing, FIGURE 1 shows several steps involved in the method used to fabricate the composite illustrated in FIGURE 1.

FIGURE 2 illustrates a tungsten-copper composite 10 consisting of a porous compact of tungsten particles 11 the voids of which are filled by a network of copper 12.

The following Examples 1 to 3 are illustrative of the preparation of a tungsten-copper or tungsten-copper-titanium composite contact material fabricated using hydrogen pre-treatment of a tungsten powder body and vacuum infiltration of the tungsten powder body with either copper or an alloy of copper-titanium.

EXAMPLE 1

Tungsten body vacuum infiltrated with copper, the composite consisting essentially of about 78.5% by volume tungsten, the remainder copper. The resultant composite has a diameter of about one half inch and a height of about one quarter of an inch.

Tungsten powder having a particle size of about 3 to 10 microns is pressed by any suitable means such as by an automatic press at a pressure about 4 tons per square centimeter and sintered to provide a rigid skeleton. The sintered compact is placed in a hydrogen treating atmosphere and treated in the hydrogen atmosphere at about 1000° C. for about 1 hour. The compact is then subjected to an outgassing step at a temperature of about 1200° C. for about 1 hour. The porous compact is contacted with copper in a vacuum atmosphere having a pressure of about less than $5 \times 10^{-5}$ torr and heated at a temperature of 1100° C. to 1200° C. for about 20 minutes. The porous tungsten skeleton is infiltrated by the copper. The resulting tungsten-copper composite has a gas component content and material content that may release gas of about 2 p.p.m. The resultant composite is a dense structure having high electrical and thermal conductively combined with high resistance to deformation under pressure.

EXAMPLE 2

A tungsten powder body vacuum infiltrated with an alloy of copper-titanium. The composite consists essentially of about 78.5% by volume tungsten, about 21.3% by volume copper, the remainder titanium. The composite has a diameter of about ½ inch and a height of about one quarter of an inch.

Tungsten powder having a particle size of about 3 to 10 microns is pressed by any suitable means such as by an automatic press at a pressure of about 4 tons per square centimeter and sintered to provide a rigid tungsten skeleton. The tungsten skeleton is subjected to a hydrogen treating step at a temperature of about 100° C. for about 1 hour. The tungsten skeleton is outgassed at a temperature of about 1200° C. for about 1 hour. The tungsten skeleton is contacted with an alloy of copper-titanium having a titanium content of about 1% by volume titanium, the remainder copper in a vacuum atmosphere having a pressure of less than $5 \times 10^{-5}$ torr and heated at a temperature of 1100° C. to 1200° C. for about 1 hour. The composite of tungsten-copper-titanium has a gas component content and material content that may be converted to gas of about 0.5 p.p.m. The resultant composite is a dense structure having high electrical and thermal conductivity combined with high resistance to deformation under pressure.

EXAMPLE 3

A tungsten body vacuum infiltrated with an alloy of copper-titanium. The composite consists essentially of about 78.5% by volume tungsten, about 21.3% by volume copper, the remainder titanium. The composite has a diameter of about one inch and a height of about five-eighths of an inch.

Tungsten powder having a particle size of about 3 to 10 microns is pressed by any suitable means such as by an automatic press at a pressure of about 4 tons per square centimeter and sintered to provide a rigid skeleton. The tungsten skeleton is subjected to a hydrogen treating step at a temperature of about 1000° C. for about 1 hour. The tungsten skeleton is outgassed at a temperature of about 1250° C. for about 1 hour. The tungsten skeleton is contacted with an alloy of copper-titanium having a titanium content of about 0.5% by weight titanium, the remainder copper in a vacuum atmosphere having a pressure of less than $5 \times 10^{-5}$ torr and heated at a temperature of 1150° C. for about 20 minutes. The composite of tungsten-copper-titanium has a gas component content and material content that may be converted to gas of about 1 p.p.m. The resultant composite is a dense structure having high electrical and thermal conductivity combined with high resistance to deformation under pressure.

The present invenition is not intended to be limited to the disclosure herein, and changes and modifications may be made by those skilled in the art without departing from the spirit and the scope of the present invention. Such modifications and variations may be made by those skilled in the art without departing from the spirit and the scope of the present invention. Such modifications and variations are considered to be within the purview and the scope of the present invention and the appended claims.

Having thus described our invention, we claim:

1. In the manufacturing of materials, a method suitable for making a material for use as a current carrying material having a gas content and material content that may release gas of about 7 p.p.m. or less comprising the steps of
    treating a porous powder body of a refractory material in a reducing atmosphere at a temperature below the sintering temperature of said refractory material to remove surface films present on said powder,
    outgassing said refractory body by providing a vacuum environment and heating said refractory body to a temperature equal to or about 200° to 500° C. higher than said temperature of said treating atmosphere, and
    infiltrating said refractory body with a material which is substantially mutually insoluble and substantially non-reactive with said refractory material and having high electrical conductivity providing a current carrying material having a gas content and material content that may release gas of about 7 p.p.m. or less.

2. The method of claim 1, wherein said refractory material is treated in said reducing atmosphere for about ½ to 1 hour at a temperature of about 800°–1000° C.

3. The method of claim 1, wherein said refractory material is outgassed for about 1 hour at a temperature of about 1000°–1300° C.

4. The method of claim 1, wherein said refractory material is selected from the group consisting of tungsten, molybdenum, rhenium and tantalum.

5. The method of claim 1, wherein said infiltrating material is selected from the group consisting of copper, gold and silver.

6. The method of claim 1, wherein said refractory material is tungsten and said infiltrating material is selected from the group consisting of copper, gold and silver.

7. The method of claim 6, wherein said infiltrating material is copper.

8. The method of claim 6, wherein said infiltrating material includes a reactive material selected from the group consisting of titanium and zirconium.

9. The method of claim 1, wherein said reducing atmosphere is selected from the group consisting of hydrogen and dissociated ammonia.

References Cited
UNITED STATES PATENTS

| | | | |
|---|---|---|---|
| 3,150,957 | 9/1964 | Beaver | 75—222X |
| 3,303,026 | 2/1967 | Zdanuk | 75—208 |
| 3,303,559 | 2/1967 | Holtzclaw | 75—208X |
| 3,356,495 | 12/1967 | Zima | 75—226X |
| 3,359,099 | 12/1967 | Lindstrom | 75—211 |

CARL D. QUARFORTH, *Primary Examiner.*

A. J. STEINER, *Assistant Examiner.*